July 14, 1964  R. L. PROPST  3,140,736
TIMBER HARVESTING METHOD AND APPARATUS
Filed March 28, 1962  4 Sheets-Sheet 1
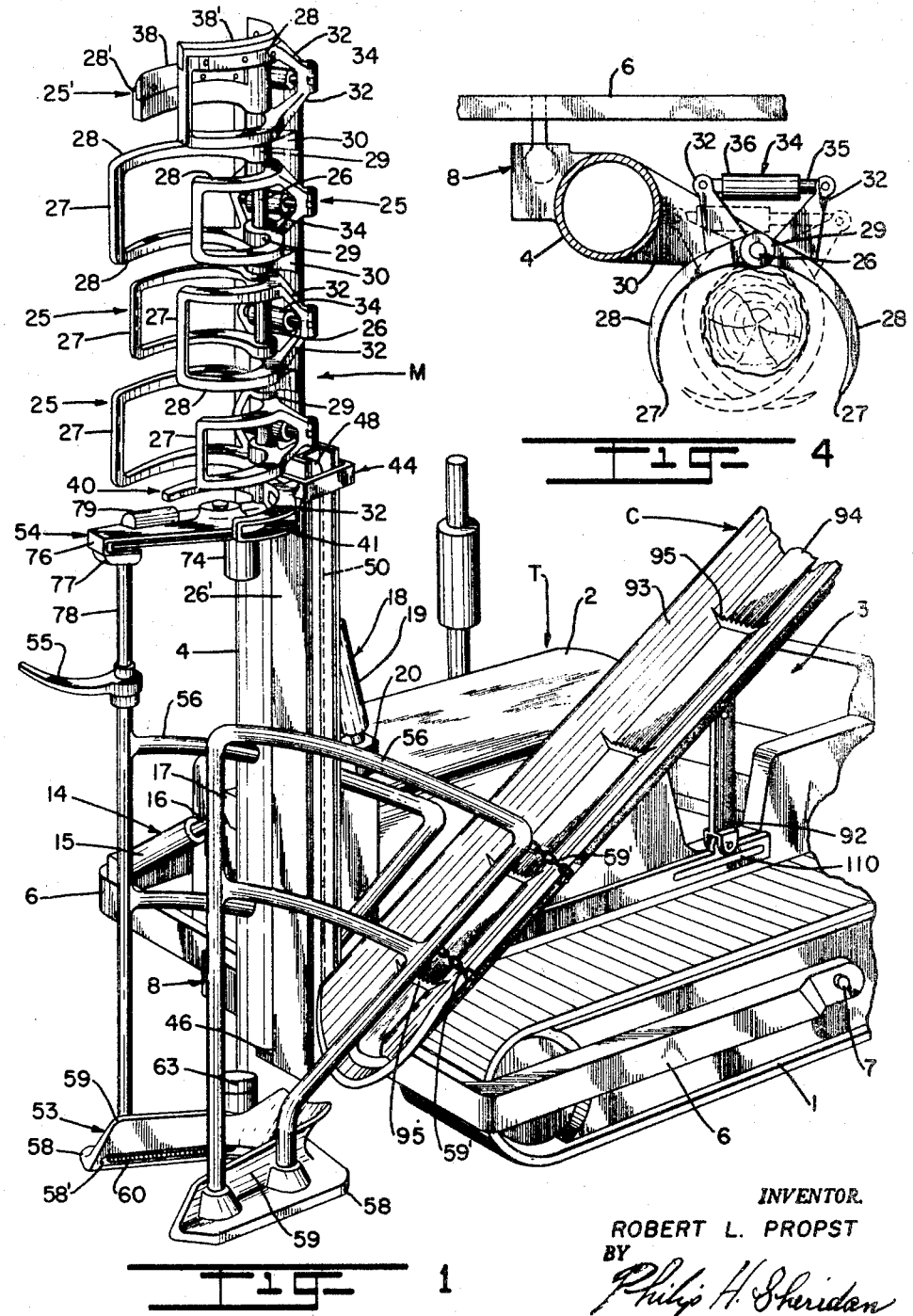
INVENTOR.
ROBERT L. PROPST
BY
Philip H. Sheridan
ATTORNEY

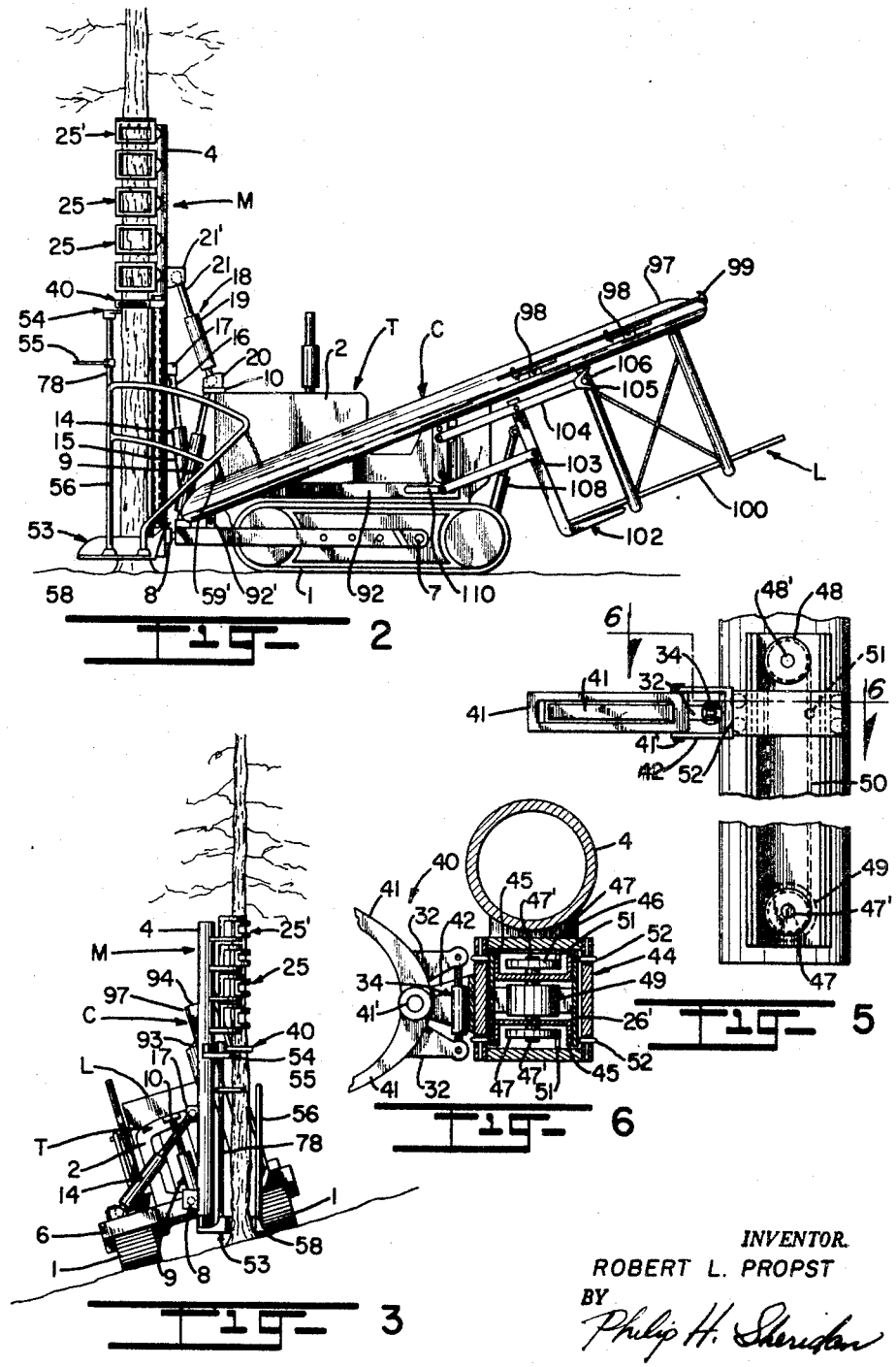

July 14, 1964  R. L. PROPST  3,140,736
TIMBER HARVESTING METHOD AND APPARATUS
Filed March 28, 1962  4 Sheets-Sheet 3

INVENTOR.
ROBERT L. PROPST
BY
*Philip H. Sheridan*
ATTORNEY

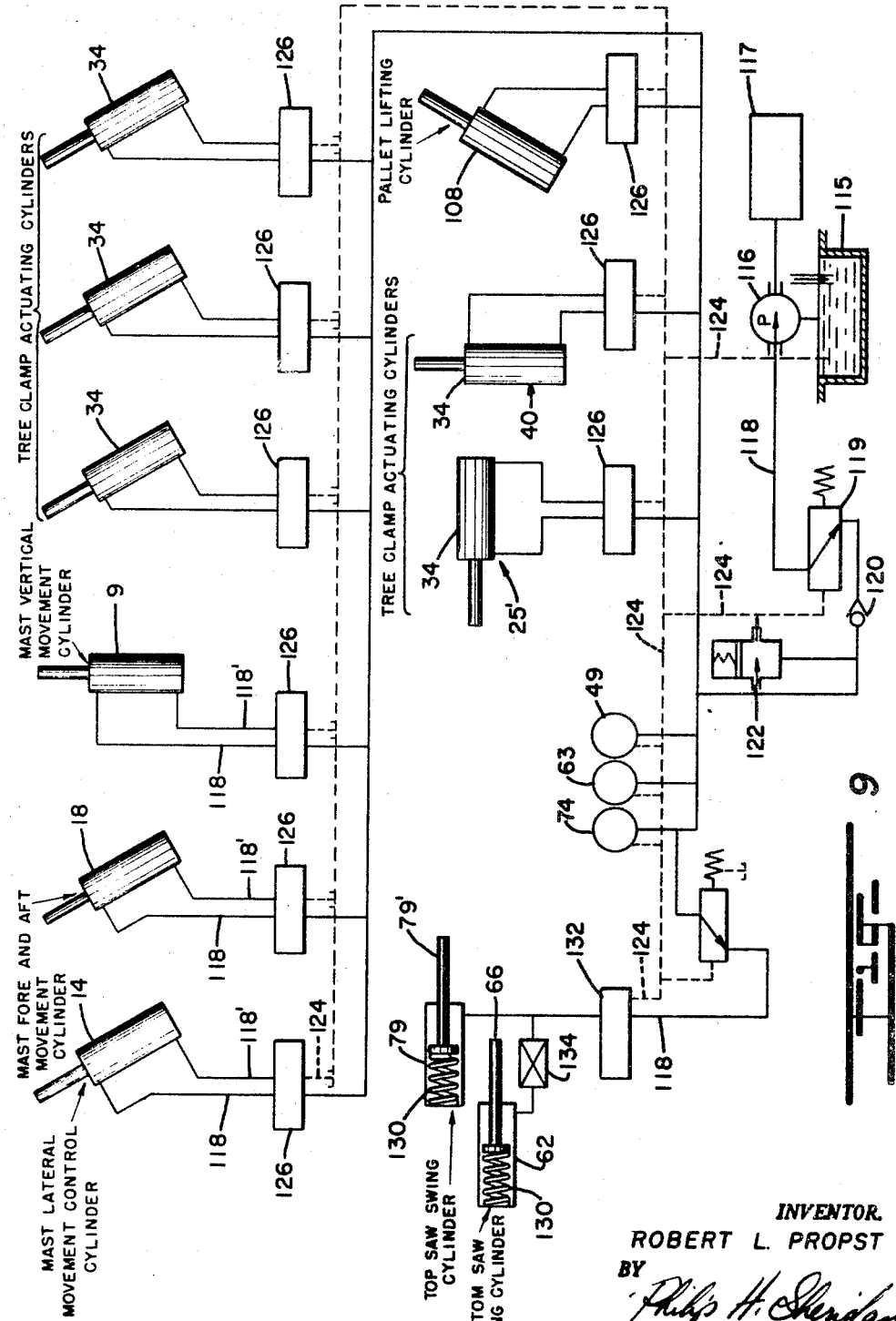

United States Patent Office 3,140,736
Patented July 14, 1964

3,140,736
TIMBER HARVESTING METHOD AND APPARATUS
Robert L. Propst, 2347 Londonderry, Ann Arbor, Mich.
Filed Mar. 28, 1962, Ser. No. 183,192
14 Claims. (Cl. 144—3)

This invention relates to a new and improved method and means for harvesting trees, and more particularly relates to a method and apparatus which is specifically adapted for use in felling, trimming and cutting trees into logs of the desired length.

In the past, timber harvesting procedures have required either a number of hand operations or complicated machine operations, or both, in felling, limbing and cutting trees to length, then transporting the cut lengths away from the site. The felling operation in particular poses a major problem due to the weight and size of trees, entangling protuberances, and often the lack of sufficient clearance area to permit the tree to fall freely to the ground. This is also very time-consuming, often dangerous, and is very undesirable for example in tree-thinning operations where the trees are close together and large numbers of trees would have to be cut to provide sufficient area for the felling operation.

In accordance with the present invention, it is a principal and foremost objective thereof to overcome the above and other disadvantages and drawbacks in timber harvesting operations through an efficient method and means for handling and cutting the trees in place and converting standing trees to stacked cords of uniform length logs thereby avoiding the necessity for large clearance areas in handling each tree.

It is another object of the present invention to make provision for a safe and economical method and means for cutting and trimming trees in standing relation in a minimum number of steps and in a fast and dependable manner.

It is another object of the present invention to provide for a portable apparatus, particularly adapted for use in timber harvesting, which is safe and reliable in operation, effects considerable savings in time and labor over known apparatus, and which is further very effective for use in tree-thinning operations.

It is a further object of the present invention to provide for a method of timber harvesting which avoids a number of steps previously required in such operations and which specifically accomplishes, in rapid succession, trimming and cutting of a tree into individual logs of the desired length.

It is a still further object of the present invention to make provision for a novel and improved timber harvesting apparatus which is comparatively lightweight, capable of operation by one man either manually or automatically, and which is conformable for use in trimming and cutting trees of substantially all sizes and shapes to the desired length and in virtually any terrain.

It is an additional object of the present invention to provide in a timber harvesting apparatus a unique means for gripping a tree and controlling its descent while severing the tree into predetermined lengths, and to further provide in association therewith a unique means for severing, ejecting and loading each length in a rapid and efficient manner.

The above and other objects, advantages and features of the present invention will become more readily understood from the following detailed description taken together with the accompanying drawings, in which:

FIGURE 1 is a perspective view of a preferred form of timber harvesting apparatus, in accordance with the present invention;

FIGURE 2 is a side elevational view of the preferred form and showing in addition a preferred type of loading assembly to be used in association therewith;

FIGURE 3 is a front view of the preferred form shown in relation to a tree preliminary to the trimming and cutting operation;

FIGURE 4 (Sheet 1) is a top, detailed plan view of the tree-gripping assembly employed in the preferred form of invention;

FIGURE 5 is a side view of a preferred form of tree descent clamping assembly;

FIGURE 6 is a top plan view of the tree descent clamping assembly of FIGURE 5, in accordance with the present invention;

FIGURE 9 is a somewhat schematic diagram of a preferred form of hydraulic circuit employed, in accordance with the present invention.

Figure 8:
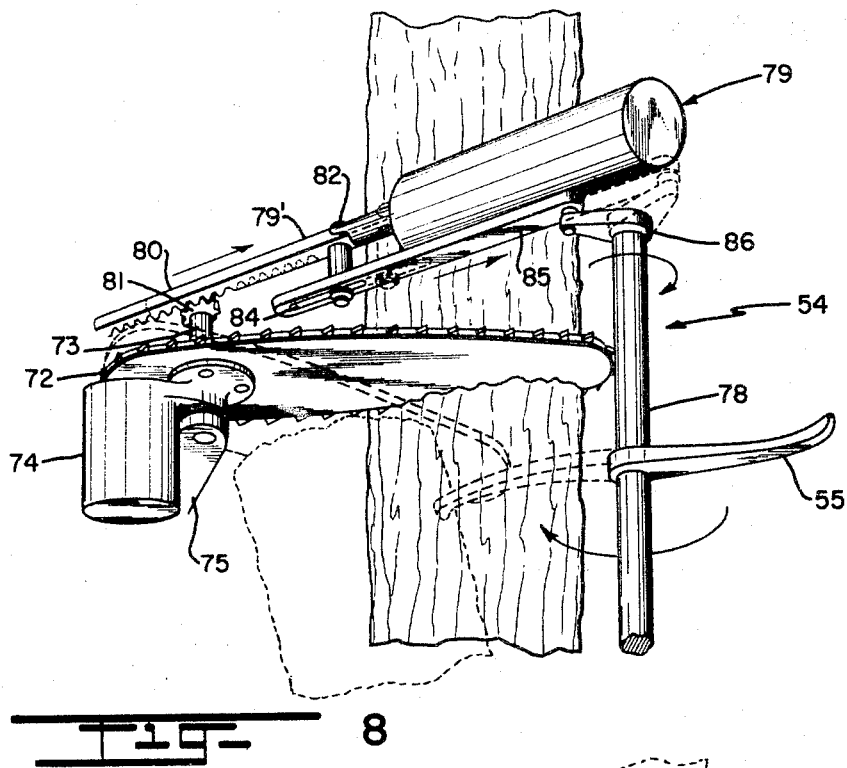
FIGURE 8 is a perspective view illustrating a preferred form of upper cut-off saw assembly in its two end positions of operation.

Referring in detail to the drawings, there is shown by way of illustrative example in FIGURES 1–3 a portable timber harvesting apparatus, or rig, broadly comprised of a tractor T or other suitable power-driven vehicle, upon which is mounted a vertical mast assembly, designated at M, a conveyor section C extending rearwardly from the mast section and a loading section L at the back end of the tractor. In the present form, the rig is designed for pulpwood logging from small trees, although it will be apparent from the following that it would have application in harvesting various types and sizes of trees.

The tractor T is conventionally provided with track portions 1 for covering rugged terrain, along with a motor drive unit 2 and an operator section 3. The mast assembly M includes a main mast or standard 4 which serves as the carrier for the principal elements of the present invention used in the tree limbing and cutting operations. The means employed to support the mast assembly will be largely governed by the type of vehicle used, and in the present form, a U-shaped brace 6 is pivotally secured, such as by studs 7 to the outsides of the track portions 1 and the mast 4 is mounted on the brace 6 through a ball-socket joint 8, and in turn the outer end of the brace 6 is connected through hydraulic cylinder 9 to a top bracket 10 so that the brace and mast assembly are vertically adjustable. The joint 8 permits universal movement of the entire mast assembly, and a pair of cylinders are connected in swiveled relation to control this movement including a lateral pivot control cylinder 14 positioned with its cylinder end 15 having a universal joint for connection to a corner of the brace 6 and its piston end 16 connected through a universal joint 17 to one side of the mast. In this way, the mast is controlled for universal movement both in relation to the brace and tractor and, for example, to permit it to assume the attitude shown in FIGURES 2 and 3. A fore-and-aft cylinder 18 is positioned with cylinder end 19 attached through another universal joint 20 to the bracket, and piston end 21 extends upwardly and is secured for universal movement as at 21' to the back of the mast where upon extension and retraction of the piston 21 the mast will be controlled in fore-and-aft movement in relation to the brace 6 and the tractor. As a result, through adjustable mounting of the mast section in relation to the tractor, the attitude of the mast can be adjusted for vertical alignment with the tree as a preliminary to the cutting operation.

In accordance with the present invention, the entire mast assembly is designed to carry out in rapid succession the steps of gripping the tree trunk, performing an initial cut at the base of the tree, performing a second cut or severing operation in spaced relation above the base and below the gripping area, ejecting the cut length, lowering the uncut portion of the tree into cutting position below the gripping area while simultaneously limbing or shearing limbs from the tree trunk as it passes through the gripping area into cutting position, then again cutting the trunk at the desired spaced interval above the base and removing the cut length, and following this sequence of lowering, cutting and removing until the entire useable portion of the tree trunk has been severed into a number of predetermined lengths. In this manner, the tree remains in vertical relation throughout the cutting and trimming operation so as to obviate felling or laying the tree in horizontal relation for the cutting operation and as well to make the tree easier to handle as it is being cut.

To accomplish the above sequence of operations, the gripping means is preferably in the form of a series of tree clamps 25, each pivotally carried in vertical relation on a shaft or equipment mast 26 which is in turn supported in parallel relation along the upper portion of the mast 4. In more detail, each tree clamp is similarly comprised of arcuate halves, each half being in the form of an open U-shaped frame including a closed end 27, upper and lower horizontal arms 28 and bosses 29 at the inner free end of each arm, mounted on the mast 26 to permit pivotal movement of the clamp halves about the vertical axis of the mast. Spacers 30 are positioned between the lowermost and uppermost bosses of each of the clamp assemblies, the spacers being affixed to the mast 4 and similarly being provided with openings to receive the shaft or equipment mast 26. Each clamp half is also provided with a rearwardly extending arm 32 at a location adjacent the boss and the arms 32 are spaced to accommodate a clamp-actuating cylinder 34 therebetween so that outward movement of its piston rod 35 relative to cylinder portion 36 will cause contraction of the clamps into gripping relation with the tree trunk, as best seen in the dotted-line position of FIGURE 4. A series of three tree clamps are arranged as shown in vertical relation on the equipment mast, although this number may be suitably varied, and in a manner to be described the clamps are actuated simultaneously to move into gripping engagement with the tree trunk.

Positioned at the extreme top of the equipment mast is a special clamp 25' serving as a limb-shearing assembly as the tree is caused to be lowered through the clamp assembly into cutting position. The limb-shearing assembly is connected and actuated by a clamp-actuating cylinder 34 as in each of the clamp assemblies 25, but in this instance, one half of the clamp is in the form of a single arcuate arm 28' having an arcuate blade 38 joined thereto in upwardly facing relation. The other half of the clamp is formed in much the same fashion as the gripping clamp halves and is provided with a blade 38' affixed to the upper arm portion 28 thereof. In this way, as the tree trunk is lowered for each successive cut, the branches are sheared off by the blades 38 and 38' at the top of the mast, and where the trunk weight will supply some of the necessary force, preferably combined with powered means made available in a manner to be described.

In order to force the trunk downwardly through the limb-shearing assembly, a tree descent or pull-down clamp assembly 40 is positioned directly beneath the gripping clamps 25. The assembly 40 includes arcuate arms pivotally connected together by pin 41', and a bracket 42 to support the assembly in spaced relation on a slide carrier 44. Preferably, the latter is mounted for vertical sliding movement on a travel beam 26' which is illustrated (FIGURES 5 and 6) as being attached to the mast 4, although the beam may if desired form a vertical continuation of the mast. The clamp is also provided with a pair of arms 32 for disposition of a clamp-actuating cylinder 34 therebetween which cylinder may be selectively actuated to cause the arms to engage the tree trunk and to force it downwardly into the cutting area in a manner to be described. The clamp arms 41 are therefore designed to be relatively narrow in order to establish more positive, biting engagement with the tree. In addition, the arms may be provided with teeth, not shown, along their inner surfaces.

To enable controlled vertical travel of the clamp 40 along the travel beam 26', the latter is generally H-shaped in cross-section, as seen from FIGURE 6, being defined essentially by spaced, outwardly facing vertical channels 45, and the entire beam is mounted upon bracket supports 46 at the base and directly beneath the gripping clamp assembly on the mast 4. The channels can serve as housings for a double chain drive assembly, illustrative of one form of drive means for the pull-down clamp, including drive sprockets 47 mounted on a common shaft 47', extending horizontally through the lower extremity of the channels and driven sprockets 48 mounted on opposite ends of a common shaft 48' at the upper extremity of the beam. A suitable power source, e.g., a hydraulic motor designated at 49 (FIGURE 6) may be geared to the drive shaft 47' and a chain 50 is trained over each set of sprockets 47 and 48.

The slide carrier 44, of open rectangular shape, is shown secured to the chain drive assembly by clips 51 attached to each chain, and rollers 52 are disposed on the carrier for slidable movement along the sides of the beam. Energization of the motor thus will cause the descent clamp 40 to traverse a complete path of movement between the end limits of the beam, and engagement of the uncut tree section at the end of each cutting operation will enable the clamp in descent to force the tree downwardly into position for the next cutting operation. The clamp may also be employed to impart an upsetting action on the tree section when required to shear off stubborn limbs at the limb-shearing assembly.

Figure 7:
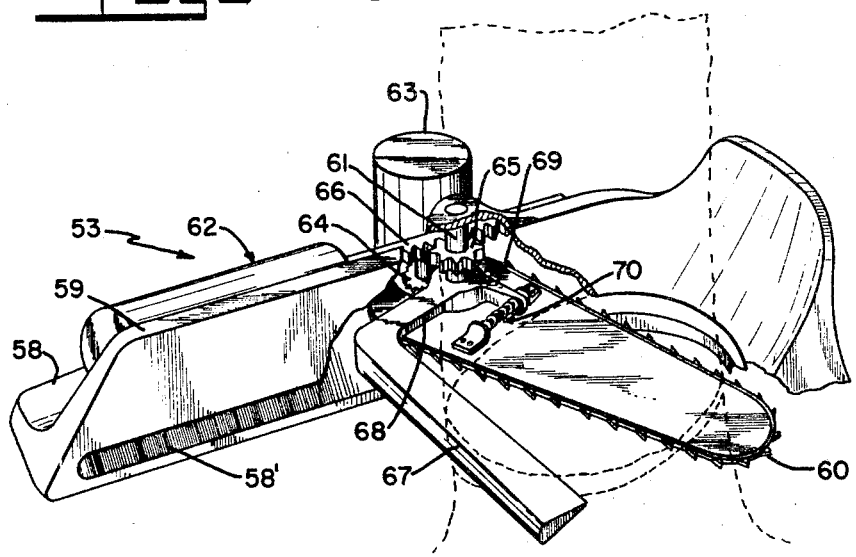
FIGURE 7 is a detailed perspective view of the lower cut-off saw assembly of the preferred form.

In cutting the tree trunk into sections of specified lengths, it is preferred to use one cut-off saw or other desired severing means to perform an initial cut at the base of the trunk and a second severing means to perform a cut above the base at the established length. Moreover, once the section is cut, it must be removed from the cutting area to permit lowering of the uncut trunk section into position for the next cutting operation. For this purpose, a severing or shearing assembly is arranged beneath the gripping clamps 25 and tree descent clamp 40 and is broadly made up of a lower cut-off saw assembly 53, upper cut-off saw assembly 54 and a log kicker 55, together with a pair of spaced guide rail frames 56. As best seen from FIGURES 1 and 7, the lower cut-off saw assembly includes a generally V-shaped base 58 of rugged construction and having divergent sides 59 with a relatively deep, horizontal slotted portion 58' extending through the base 58. By adjustment of the cylinder 9 the base is located as close to the ground as possible and acts as a shield for a chain cut-off saw or shear 60 which is arranged for horizontal swinging or pivotal movement from one side 59 through the slotted portion 58'; accordingly, the saw is mounted on a vertical shaft 61 (FIGURE 7) within the base and and is preferably driven by a separate power source as defined by a saw motor 63 and gear 64.

In order to control pivotal swinging movement of the saw, the shaft 61 has a pinion 65 for geared connection to a rack 66, forming a part of the piston rod for saw swing drive cylinder 62, so that hydraulic control by the cylinder of movement of the shaft and connected chain saw 60 is effected. Thus, the motor drive 63 and cylinder 62 are separately powered to cause simultaneous driving and swinging movement of the saw across the path formed with the free end of the saw passing through the slotted portion 58'. In addition, a wedge 67 has an arm 68 disposed on the shaft 61 and is so arranged in relation to the saw as to follow the swinging movement of the saw through the tree trunk. An opposite arm 69 extends forwardly and has connected thereto an adjustable, spring-wound tensioning member 70 to regulate the tensioning of the wedge and which allows the wedge to take a fixed position in relation to the saw as the latter completes its stroke.

The upper cut-off saw 54, shown in FIGURE 8, is similarly in the form of a chain drive saw or shear 72 mounted for swinging movement on shaft 73 with a motor drive 74 positioned for geared connection into the shaft to impart driving rotation to the saw; a support arm 75 extends rearwardly from the shaft 73 for connection to the main mast 4. The saw assembly is also housed within a shield 76, shown in FIGURE 1, and the outer end of the shield has a lower extremity 77 positioned on a vertical post 78 which extends upwardly from one side of the base 58 for the lower cut-off saw and actually forms a part of the guide rail frame 56. A saw swing drive cylinder 79 is mounted along one side of the shield and includes a piston rod 79' which is toothed as at 80 to form a rack for geared engagement with pinion 81 keyed to the upper extremity of the shaft 73. The rod 79' is also fitted with a vertical pin 82 journaled for longitudinal sliding movement in a slot 84 of linkage arm 85, the latter being secured to a crank arm 86 keyed to the post or shaft 78. In this relation, inward movement of the rod 79' will cause swinging movement of the saw from beneath the shield horizontally across the cutting path and as the rod reaches the end of its stroke, the pin 82 will contact the end of the slotted portion on the arm 85 causing rotation of the crank arm 86 and of the log kicker 55 in a direction to swing across the cutting area striking the cut length of the tree in a rearward direction toward the conveyor C. The guide rail assembly 56 is formed and connected to opposite sides of the base 58, as clearly shown, to converge rearwardly toward the conveyor section. Chains 59' (FIGURE 1) are shown interconnecting the assembly 56 and conveyor C so that the conveyor is free to follow the rail assembly in order to receive the cut lengths as they are ejected from the cutting area.

The conveyor section C may be of any suitable form, and forms no part of the present invention other than its relation to the cutting assembly and its function of removing the cut lengths to clear the cutting area for successive advancement of the tree section into cutting position. Preferably, however, the conveyor section is in the form of an elevator mounted in inclined spaced relation above track portion 1 and supported in pivotal relation as shown by means of a supporting frame 92 and forward pivot 92' interconnecting the conveyor and brace 6. Broadly, the conveyor consists of a trough 93 for receiving the logs, together with a centrally located conveyor belt 94 having transverse, spaced blades 95 thereon. In a manner not shown, the conveyor belt is operationally controlled at the cab 3 so as to advance each log rearwardly to platform 97, as shown in FIGURE 2. The platform 97 includes a pair of log push-off levers 98 which are caused to pivot laterally against the side of the log upon actuation through contact of the log end with a lever 99. The log will then be forced off the platform into a suitable log pallet 100. Preferably, the log pallet is adapted for use with a fork lift unit 102 pivotally mounted on the back of the tractor through lower arms 103 and upper spaced arms 104, the latter having hooks 105 adapted to engage pins 106 on the pallet. The fork lift is disposed for pivotal movement from a position resting on the ground to the inclined position through actuation of a cylinder 108 extending between the base of the tractor and the front of the fork lift and each lower arm 103 has its lower end adapted for sliding movement along slotted portion 110 on each side of the conveyor support section 92. Through this expedient, the logs may be conveyed away from the cutting area and easily loaded onto the pallet. It will be noted here, also, that the conveyor section and pallet will also serve as a counterbalancing load against the weight imposed by the tree section on the front of the tractor.

In order to most effectively carry out the various operations associated with the cutting and limbing of each tree, a hydraulic power source is preferably employed to control actuation of the various assemblies through their associated cylinders. The power source is located at the forward end of the tractor within the motor housing and in the present form of invention, manual controls for the valves to be described are located in the operator section 3 to individually, and in some cases simultaneously, control movement of the various piston rods and hydraulic motors. As schematically shown in FIGURE 9, the hydraulic circuit includes a tank represented at 115 which serves as a source of fluid for a hydraulic pump 116 driven off the engine drive 117. The pressure line is indicated in full by the line 118 and leads from the pump to an unloader valve 119, then through a check valve 120, accumulator 122 and to the various cylinder controls. Return lines from the various control sections are indicated by dotted lines 124.

The mast assembly includes the lateral tilt cylinder 14, the fore-and-aft cylinder 18 and the vertical lift 9, all of which are double-acting and may be manually controlled by three-position, open center valves 126. In this way, auxiliary pressure lines 118 and 118' lead to opposite ends of the cylinder from the valve to selectively control either inward or outward movement of the piston rods so that the vertical mast can be swiveled laterally and fore-and-aft for alignment with the tree trunk, regardless of the angle at which the vehicle may be resting relative to the tree, as well as to control the height of the mast in relation to the ground through the cylinder 9. Similarly, clamp-actuating cylinders 34 for the gripping clamps 25, limb-shearing clamp 25' and pull-down clamp 40 are double-acting cylinders which are manually controlled by three-position open center valves 126 so as to be movable between the clamping and release position. Thus, each of the clamp-actuating cylinders 34 may be separately controlled, although in normal practice the clamp-actuating cylinders 34 for cylinders 25 and 25' are correlated in operation independently of the cylinder for clamp 40.

The bottom saw swing cylinder 62 is preferably of the single-acting type, as is the top saw swing cylinder 79 and each is provided with compression springs, represented at 130, normally urging the pistons to an outward position relative to the cylinders; or this could be similarly accomplished by double-acting cylinders similar to the hydraulic cylinder arrangement for each gripping clamp. To actuate these cylinders, a two-position directional valve 132 is positioned in the pressure and return lines leading to and from, respectively, the cylinders so that in performing the initial cut, fluid preferably is supplied simultaneously to the bottom saw swing cylinder 62 for severing the base of the tree trunk and to the top swing cylinder to cause swinging movement of the upper saw through its cycle, or the initial cutting operations may be carried out in sequence. Once the initial cut has been performed by the lower saw assembly, it is desirable to make the lower saw inoperative for future cutting, since subsequent cuts will only have to be performed by the upper saw assembly, and accordingly an on-off valve 134 is positioned in the auxiliary line leading to the bottom saw swing cylinder 62 which can be manually turned to the closed position, thereby to interrupt fluid communication with the cylinder. For each cycle of the lower saw assembly the piston rod 66 will be urged from its outer position inwardly through the cylinder while engaging the pinion for the drive shaft causing the saw to swing across the cutting path through the base of the tree trunk. Upon reaching the end of its stroke, fluid pressure is withdrawn whereupon the spring 130 will urge the piston back to its outermost inoperative position, thus causing the chain saw to return to its original position within the shield. In a similar manner, the piston rod 79' for the top saw assembly will be urged inwardly through the cylinder under the force of fluid pressure to cause the chain saw 72 to swing across the cutting path, followed by swinging movement of the log kicker 55. At the end of its stroke, the spring 130 for the top saw cylinder will force the piston back to its inoperative position causing the log kicker 55 and the chain saw to return to their original positions.

The pallet lift cylinder 108 is a double-acting cylinder controlled in operation by a separate valve 126 to cause movement of the fork lift and pallet between the horizontal and inclined positions as previously described. Again, the cylinder 108 will be separately controlled by the operator through the manual control valve 126 for that cylinder in performing the loading operation.

It is believed that the over-all operation of the timber harvesting apparatus will be apparent from the foregoing description, although the following is intended to set forth a preferred mode and sequence of operations employed in performing the cutting and trimming operations. As stated, a principal feature of the method and apparatus of the present invention is the performance of all the cutting and trimming operations while retaining the tree in its vertical position, thus eliminating dangerous and costly consequences of the more conventional felling and bucking procedures. As can be appreciated, however, from FIGURES 1-3, the portable rig will approach the tree to be cut with the operator making the necessary adjustments to regulate the attitude and disposition of the mast so as to align it with the tree and this is best shown in FIGURE 3. Once aligned, the vehicle is advanced with the clamps 25 initially in the release position so as to loosely surround the tree trunk at an intermediate portion shown in full in FIGURE 4. The clamp-actuating cylinders are then operated to force the clamp arms into gripping engagement with the tree and to achieve a powerful and distributed grip along a substantial area thereof. The bottom cut-off saw action is then initiated and the chain saw is caused to move out from under its shield through actuation of the bottom saw swing cylinder to sever the tree at its base. Here, the saw chain is indicated as being hydraulically driven, but may be driven also by a conventional type of power take-off link or electric drive from the vehicle.

The top cut-off saw is then actuated to sever the tree at the desired length, and as the cut-off saw completes its stroke, the log kicker 55 is activated to swing into engagement with the log and eject it over into the conveyor section. The conveyor or elevator will then automatically remove the log for loading onto the log pallet or other suitable rack.

At the completion of the first cutting action, the next step is the lowering of the uncut tree section down along the mast into cutting position. First, the tree clamps are relaxed enough to allow the tree to slide; but, to control the descent the clamp 40 is actuated to engage the tree to prevent uncontrolled falling and, if necessary, to overcome the resistance of any limbs engaging the limb-shearing assembly. At this stage, the limb-shearing blades will shear off the tree limbs and perform the trimming operation, although unusually large limbs may be trimmed by the operator simply by gripping the tree with the main clamps and performing any necessary cutting. Also, the shearing blades may be activated with short reciprocating horizontal strokes by their clamp-actuating cylinder to further facilitate the shearing action.

In cutting position, the on-off valve 134 would be closed and fluid pressure supplied only to the top saw drive cylinder which with the motor drive would advance the chain saw through the cutting path to sever the next specified length, after which the log kicker would automatically eject the length into the conveyor section. When a suitable number of logs are accumulated in the pallet, it is then removed from the fork lift and an empty pallet substituted therefor. If desired, the vehicle may be employed to transport the loaded pallet in attached relation before removing.

For the purpose of clarification, the various hose connections for the hydraulic system have not been illustrated in the drawing except as represented in FIGURE 9, thus to better illustrate the relationship between parts comprising this invention.

If desired, in large tree-cutting operations, suitable shields can be placed on the vehicle to prevent falling limbs from interfering with the operation of the working mechanism of the apparatus, or from injuring the operator. Moreover, the obvious advantages of the tree-gripping operation and particularly their relative disposition on the mast would make them very useful in harvesting relatively long poles where the clamps would be designed to grip the tree, the bottom saw would perform its cut and then the tree would be laid over in a controlled descent whereupon the top cut-off and limb trim would be accomplished in a horizontal position. Thus, the present invention is not expressly confined merely to the harvesting of trees into short lengths and is easily conformable for use in innumerable types of timber harvesting operations as will be apparent to those skilled in the art.

Accordingly, it is to be understood that various modifications and changes may be made in addition to those set forth, particularly in the various individual components employed, as the more important features of the present invention are derived primarily from the relative disposition and arrangement of parts as well as the sequence of operations carried out, and accordingly, such changes as are necessary or would be obvious may be made without departing from the scope of the present invention as defined by the appended claims.

What is claimed is:

1. A timber harvesting apparatus comprising, a portable rig including an upright mast, tree gripping means on the mast arranged to grip a portion of a tree trunk in spaced relation above the base of the trunk, a severing assembly beneath said gripping means including severing means and drive means to energize said severing means for horizontal advancement through the trunk at spaced intervals, ejecting means correlated with the advancement of said severing means to follow the movement of said severing means and to eject each cut length away from said severing assembly, tree descent means for clamping said tree trunk and successively lowering it while supported by said tree gripping means, said severing assembly and ejecting means being activated in succession for severing and ejecting each length of the tree upon successive lowering of the tree into cutting position.

2. A timber harvesting apparatus comprising, an angularly adjustable mast adapted for alignment with a tree to be cut, tree gripping means on the mast arranged to grip a portion of the tree trunk in spaced relation above the base, spaced upper and lower severing means beneath said gripping means including drive means to energize said severing means for horizontal advancement through the trunk at spaced intervals, and tree descent means between said gripping means and said severing means to selectively grip the uncut section of the tree trunk for lowering into cutting position between said severing means, thereby to provide for severing the tree into selected lengths according to the spacing between said severing means.

3. A timber harvesting apparatus comprising, an angularly adjustable mast adapted to be vertically aligned with and beside a tree to be cut, releasable tree gripping means on the mast arranged to grip a portion of the tree trunk in spaced relation above the tree base, a cut-off saw beneath said gripping means including drive means to energize said cut-off saw for horizontal advancement through the tree trunk a selected distance above the tree base, ejecting means following the movement of said cut-off saw to eject each cut length from the cutting area, tree descent means between said gripping means and cut-off saw to selectively grip the uncut section of the tree trunk for lowering it into cutting position upon releasing said gripping means, said cut-off saw and ejecting means being activated in succession for severing and ejecting each length of the tree upon successive lowering of the tree into cutting position.

4. A timber harvesting apparatus according to claim 3 being further characterized by a cut-off saw at the base of said mast including drive means to actuate said saw for horizontal advancement through the base of the tree trunk.

5. A timber harvesting apparatus according to claim 3, said gripping means being defined by at least one pair of gripping arm members mounted in pivotal relation to said mast, and hydraulically-actuated means to activate said arms for pivotal movement into and out of gripping engagement with the tree trunk.

6. A timber harvesting apparatus according to claim 5, said tree descent means being in the form of a pair of pivotal arm members in spaced vertical relation beneath said gripping means and carrier means mounting said arm members for controlled vertical sliding movement between said cut-off saw and the base of said mast.

7. A timber harvesting apparatus according to claim 6, said carrier means being defined by a travel beam secured to said mast, a chain drive assembly on said beam and a slide carrier operably connected between said pivotal arm members and said chain drive assembly.

8. A timber harvesting apparatus comprising, a portable rig including a vertical mast with lateral and fore-and-aft aligning means secured to said mast to establish vertical alignment between said mast and a tree to be cut, tree gripping means on the mast arranged to grip a portion of the tree trunk in spaced relation above the base of the tree, a lower cut-off saw at the base of said mast including drive means to energize said saw for horizontal advancement through the trunk at the base thereof, an upper cut-off saw between said lower cut-off saw and said gripping means including drive means to energize said upper cut-off saw for horizontal advancement through the tree trunk a specified distance above the base, ejecting means following the movement of said upper cut-off saw to eject the cut length away from standing position, tree descent means beneath said gripping means to grip the uncut section of the tree trunk for lowering into cutting position between said cut-off saws, said upper cut-off saw and ejecting means being activated in succession for severing and ejecting each specified length of the tree upon successive lowering of the tree into cutting position.

9. A timber harvesting apparatus comprising: a tractor-mounted rig including a vertical mast assembly with lateral and fore-and-aft control means between said mast and tractor to establish vertical alignment between said mast and a tree trunk to be cut, vertical control means between said mast and tractor to raise and lower said mast, trunk gripping means carried on said mast to grip a portion of the trunk; a cut-off saw assembly having a lower cut-off saw at the base of the mast including hydraulically-actuated means to energize said saw for advancement through the trunk base for severing thereof, an upper cut-off saw between said lower cut-off saw and said gripping means including hydraulically-actuated means to energize said upper cut-off saw for advancement through the tree trunk for severing thereof at a specified length above the base and ejecting means beneath said upper cut-off saw and correlated with the movement of said upper saw to eject the cut length away from the cutting area between said saws, and tree descent means beneath said gripping means being correlated with the release of said gripping means to engage the uncut section of the tree trunk for lowering into cutting position between said cut-off saws, said upper cut-off saw and ejecting means being movable in succession for severing and ejecting each specified length of the tree upon successive lowering of the tree section into cutting position.

10. A timber harvesting apparatus according to claim 9, said mast assembly including a main mast, an equipment mast in juxtaposition to the upper part of said main mast for carrying said tree gripping means, a travel beam in juxtaposition to the lower part of said main mast for slidably carrying said tree descent means thereon, and a joint mounting said main mast in swiveled relation to said tractor.

11. A timber harvesting apparatus according to claim 9 being further characterized by a guide rail frame between said upper and lower cut-off saws to guide the ejection of each tree length away from the cutting area.

12. A timber harvesting apparatus according to claim 9, said lower cut-off saw including a generally V-shaped housing having divergent sides flanking the base of the tree trunk, a horizontal slotted portion in said housing, a chain-driven saw mounted on a drive shaft on one side of said housing and said hydraulically-actuated means being geared to said drive shaft to activate said saw for horizontal advancement through the opening formed between said divergent sides.

13. A timber harvesting apparatus comprising, a tractor-mounted rig including a mast carried in pivotal relation on said tractor with lateral and longitudinal control cylinders positioned between said mast and said tractor to establish vertical alignment between said mast and a tree to be cut, a vertical series of trunk gripping clamps pivotally carried on the mast and having hydraulic control means actuating said clamps for gripping and releasing a portion of the tree trunk in spaced relation above the base of the trunk, the top gripping clamps having upwardly facing limb-shearing blades thereon, lower severing means at the base of the rig including hydraulically-actuated means to energize said means for advancement through the trunk base for severing thereof, upper severing means between said lower severing means and said gripping means including hydraulically-actuated means to energize said upper severing means for advancement through the tree trunk for severing thereof at a predetermined length above the base, ejecting means beneath said upper severing means correlated with the movement of said upper means to eject the cut length away from said severing means, tree descent means between said gripping clamps and upper severing means being correlated with the release of said gripping clamps to grip the uncut section of the tree trunk for lowering into cutting position between said severing means, said upper severing means and said ejecting means being energized in succession for severing and ejecting each specified length of the tree upon successively lowering the tree section into severing position, a guide rail frame to guide each cut length away from said severing means upon ejection, and means adjacent said guide rail frame for removing each length.

14. In a timber harvesting apparatus according to claim 13, a conveyor section including an inclined elevator disposed adjacent said severing means, and means secured to said severing means for ejecting each severed length into said conveyor section for removal.

References Cited in the file of this patent

UNITED STATES PATENTS

| | | |
|---|---|---|
| 296,334 | Jones | Apr. 8, 1884 |
| 2,477,922 | Emery et al. | Aug. 2, 1949 |
| 2,707,008 | Bannister | Apr. 26, 1955 |
| 2,882,941 | Pope | Apr. 21, 1959 |
| 2,948,311 | McCollum | Aug. 9, 1960 |
| 3,074,446 | Earl | Jan. 22, 1963 |
| 3,074,447 | Bombardier | Jan. 22, 1963 |

FOREIGN PATENTS

| | | |
|---|---|---|
| 539,365 | Germany | Nov. 27, 1931 |